United States Patent [19]

Knightlinger

[11] Patent Number: 5,800,019
[45] Date of Patent: Sep. 1, 1998

[54] HEADREST

[76] Inventor: Thomas D. Knightlinger, 4701 Community Rd., Rocky Mount, N.C. 27804

[21] Appl. No.: 702,942

[22] Filed: Aug. 26, 1996

[51] Int. Cl.⁶ ..................................... A47C 1/10
[52] U.S. Cl. ............... 297/399; 297/397; 297/401; 297/411.25; 297/411.36
[58] Field of Search ............... 297/399, 397, 297/400, 401, 402, 406, 410, 391, 393, 411.25, 411.35, 411.36

[56] References Cited

U.S. PATENT DOCUMENTS

| | | | |
|---|---|---|---|
| 2,555,814 | 6/1951 | Pulsifer | 155/173 |
| 2,626,654 | 1/1953 | Font | 297/401 |
| 2,638,152 | 5/1953 | Pulsifer | 155/177 |
| 2,642,927 | 6/1953 | Rising | 155/174 |
| 3,387,886 | 6/1968 | Longo et al. | 297/399 X |
| 3,393,938 | 7/1968 | Meyer et al. | 297/397 |
| 3,506,306 | 4/1970 | Herzer et al. | 297/408 |
| 3,784,253 | 1/1974 | Kohler et al. | 297/410 |
| 4,154,478 | 5/1979 | Cohune | 297/397 |
| 4,619,483 | 10/1986 | Dickey et al. | 297/397 |
| 4,796,953 | 1/1989 | Pereira | 297/406 |
| 4,834,457 | 5/1989 | Head | 297/411.25 X |
| 5,273,342 | 12/1993 | Pratt | |
| 5,372,405 | 12/1994 | Cash et al. | 297/411.36 X |

FOREIGN PATENT DOCUMENTS

| | | | |
|---|---|---|---|
| 933749 | 11/1951 | France | 297/399 |
| 1007484 | 5/1957 | Germany | 297/399 |

*Primary Examiner*—Laurie K. Cranmer
*Attorney, Agent, or Firm*—Lynn E. Barber

[57] ABSTRACT

A headrest for use in combination with a seat back structure, including a clamp having a plurality of attachment sites and being detachably attachable to a side or top of the seat back structure; and a cushion detachably attachable to the clamp at any one of the attachment sites, at varying locations and angles. The clamp is D-shaped and has a rounded front portion bearing the plurality of attachment sites, and a back portion. Each attachment site is tubular and is interiorly threaded. The cushion has an external threaded portion and is attachable to the clamp by threading the threaded portion into a selected tubular portion to a desired depth to effect a desired headrest location and angle.

2 Claims, 3 Drawing Sheets

HEADREST

BACKGROUND OF THE INVENTION

1. Field of the Invention

This invention relates to headrests, and in particular, relates to an adjustable headrest which is removably attachable to a seat of a vehicle, such as an automobile, airplane or train.

2. Description of the Related Art

Many different types of headrests and neck supports have been devised for use by persons sitting in a vehicle who are attempting to nap or sleep, so that their head is supported from dropping or sagging sidewise as they sleep. The aim of such supports is to make sleep more possible and more comfortable, and to reduce or eliminate the soreness that is common when someone who has slept in an awkward position awakens. Some of these supports are fixed to the seat and are relatively unadjustable, and others are detachable and/or adjustable in position.

Unadjustable, detachable headrests may be in the form of a cushion which is essentially an extension of a seat back having a hanging lower flap against which flap the passenger sits to hold the headrest on the seat (U.S. Pat. No. 5,273,342).

Another headrest has a portion extending down the back of the seat but is adjustable and includes a mounting bracket detachably securable to the supporting unit, and a pair of headrest cushions which are adjustably mounted in the bracket by means of arcuate rod members which are clamped between jaws in the desired position (U.S. Pat. No. 2,642,927). The complexity of this structure leads to it being unwieldy to assemble, use, and carry from vehicle to vehicle.

An early example of adjustable head rests is found in the patents of Pulsifier (U.S. Pat. Nos. 2,555,814 and 2,638,152). In the '814 patent, the headrest pad has a firmly attached base which has a shallow transverse recess with a countersunk hole to secure the base to a L-shaped bracket connected as a universal connection to a bracket arm, which in turn may be connected to a plate affixed to the side of the seat. In the '152 patent, the headrest is slidably and rotatably mounted on a forward leg member that attaches to the top of a seat back. In both of these patents, there are numerous parts to assemble, and the resulting structure is not compact for easy carrying.

Most detachable headrests include inverted, modified U-shaped pieces for attaching to the seat together with complicated mechanisms for adjusting the location or angle of the headrest. Examples of such detachable, adjustable headrests or neck supports include a headrest which has a stationary lower portion having two connected U-portions and an upper portion rotatably mounted on the lower portion which can be locked in a plurality of desired angular positions using a spring, apertured disc and pins (U.S. Pat. No. 3,506,306), and a neck support which comprises a neck support roll cushion affixable to the back of a seat, with a lever so that the cushion can be secured in several positions relative to the seat back rest (U.S. Pat. No. 3,784,253).

Another neck rest (U.S. Pat. No. 4,796,953) has an automobile seat clamp means including portions which telescope together to form different sized U's. The U's are held together by a bridge portion and are clamped to the seat with thumb-screw clamps. A pivotal positioner member and a complicated arrangement of interengaging teeth and a spring-loaded plunger allow adjustment of the position of a padded head and neck member.

It is therefore an object of the invention to provide a headrest which is detachably mountable on the side or top of a seat back, and which is adjustable in angle and distance from the seat at each mounted position.

It is a further object of the invention to provide a headrest which is simple to manufacture and use, and which is compact and easy to transport.

Other objects and advantages will be more fully apparent from the following disclosure and appended claims.

SUMMARY OF THE INVENTION

The invention herein is a headrest for use in combination with a seat back structure, comprising a clamp having a plurality of attachment sites and being detachably attachable to a side or top of the seat back structure; and a cushion detachably attachable to the clamp at any one of the attachment sites, at a plurality of distances from, and angles to, the clamp. The clamp is preferably D-shaped and has a rounded front portion bearing the plurality of attachment sites, and a back portion. In the preferred embodiments, each attachment site of the plurality of attachment sites comprises a tubular portion which is interiorly threaded. The cushion has an external threaded portion and is attachable to the clamp by threading the threaded portion into a selected tubular portion to a desired depth to effect a desired headrest location and angle. The invention is particularly useful for preventing neck soreness or injury for people on long trips in an automobile or airplane.

Other objects and features of the inventions will be more fully apparent from the following disclosure and appended claims.

DETAILED DESCRIPTION OF THE INVENTION AND PREFERRED EMBODIMENTS THEREOF

Figure 1:
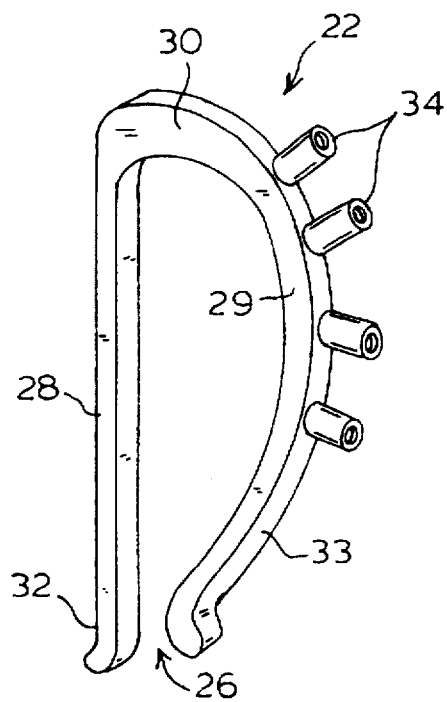
FIG. 1 is a side perspective view of a first embodiment of the clamp of the headrest of the invention.

The present invention provides a headrest which is adjustable in height and angle, and is detachably attachable to a seat back, for example, of an automobile, plane or train. As used herein, the terms "lower", "upper" and similar directional terms refer to portions of the invention when the invention is mounted on the top of a seat back, unless otherwise clear from the context, with it being understood that the invention can be also mounted on the side of a seat back.

Referring now to the figures, the headrest 20 comprises a clamp 22 (FIGS. 1–3) and an attachable cushion 24 (FIGS. 4–7). The clamp 22 is preferably generally D-shaped with an opening 26 at the bottom of the "D" for placement over the seat back. There are two arms 28, 29 of the clamp. Arm 28, which is designed to lie along the back of the seat back forms a back portion which is preferably generally straight, but may be slightly curved, or made to fit particular seats. Arm 29 is rounded forming a rounded front portion to enable it to fit over the front of a seat back which is often rounded for comfort, and so that the lower half 33 of arm 29 curves back toward the lower end 32 of arm 28 to form the "D", and with the lower tip of arm 29 preferably bent back away from arm 28, as discussed below.

Figure 10:
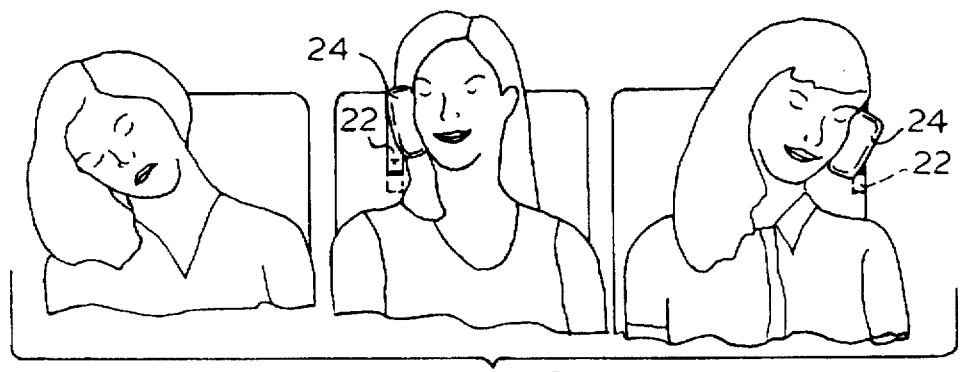
FIG. 10 is a perspective view of two possible positions of use of the headrest of the invention.

Clamp 22 is made of a resilient material so that when the two arms 28, 29 of the clamp are spread apart and placed on a seat back, they spring back toward each other as far as the seat back will allow and are thus firmly affixed to the seat back. Satisfactory materials of which the clamp 22 are made include durable, resilient plastics such as polypropylene, and metals such as spring steel, which has been heated to bend the steel to the desired shape for the clamp, and which thereafter returns to the desired shape unless held apart. Simple grasping of the two arms 28, 29 and pulling their ends gently apart is sufficient to place the clamp on a seat or to remove it from the seat. As shown in FIG. 10, placement of clamp 22 may on the top of the seat back, or placement may be on the side of the seat back.

Figure 2:
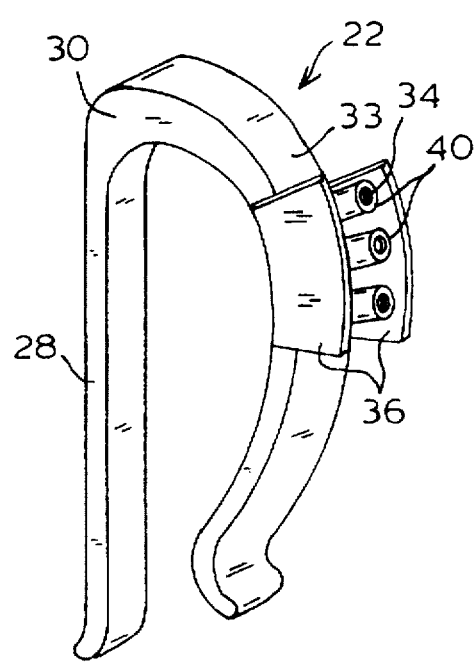
FIG. 2 is a side perspective view of a second embodiment of the clamp

In the clamp embodiments shown in FIGS. 1 and 2, which are preferably made of molded plastic, the top curved portion 30 of the "D" is preferably thicker from top to bottom than the rest of clamp 22 to strengthen clamp 22 and give it a longer life. In the clamp embodiment of FIG. 3, the clamp is simply a bent strip of spring steel which is of an even thickness throughout.

The lower tips of ends 32, 33 of the arms 28, 29, respectively, are preferably bent slightly away from each other in order to allow clamp 22 to be easily slipped over a seat back without gouging or tearing the seat upholstery material.

Figure 3:
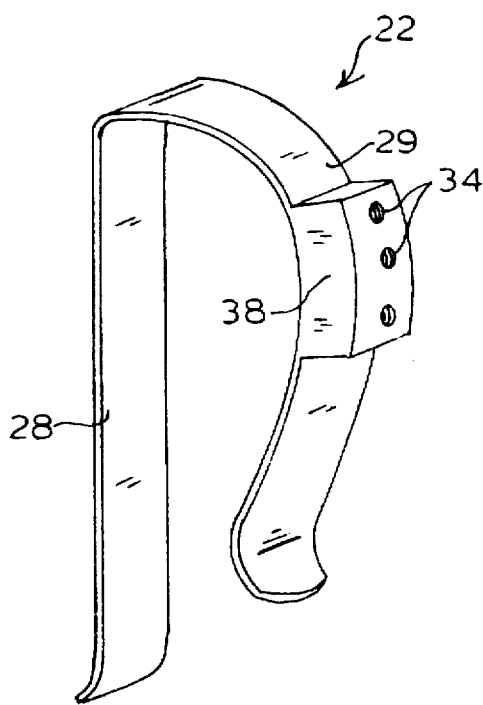
FIG. 3 is a side perspective view of a third embodiment of the clamp.

In each of its embodiments, clamp 22 has a plurality of attachment sites 34 on the arm 29. While three or four attachment sites 34 are shown in the figures, any number of sites which fit on arm 29 and provide different positions for cushion 24 to be mounted may be used. Each attachment site 34 is preferably a tubular portion having an interior which has threads. The tubular portions may be welded, or attached by other means known in the art to clamp 22, or be molded together with clamp 22. Although the tubular portions may simply protrude from arm 29 as shown in FIG. 1, it is strongly preferred to have them shielded as shown in FIG. 2 with side shield 36 to avoid injury. The view in FIG. 1 is primarily provided to show how the attachment sites 34 attach to arm 29 in the embodiments shown in FIGS. 1 and 2. Alternatively, the tubular portions may be formed as internally threaded bores in an enclosure box 38 as shown in FIG. 3.

Figure 4:
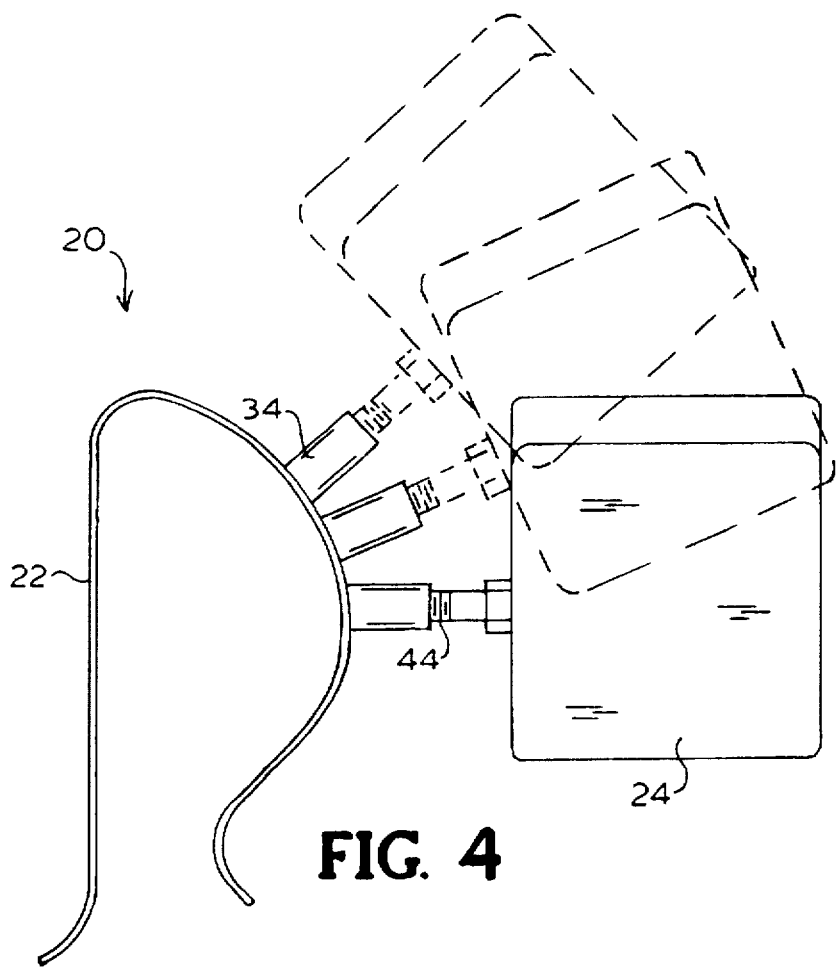
FIG. 4 is a side elevational view of a fourth embodiment of the clamp to which a cushion is attached at the lowest position, showing the use of alternative attachment sites in dashed lines.
Figure 6:
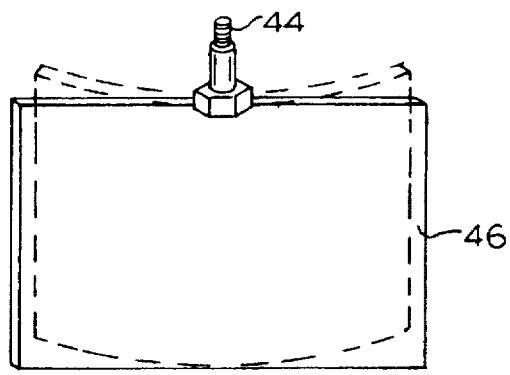
FIG. 6 is a perspective view of a plate and attached threaded portion showing an alternative curved plate in dashed lines.
Figure 7:
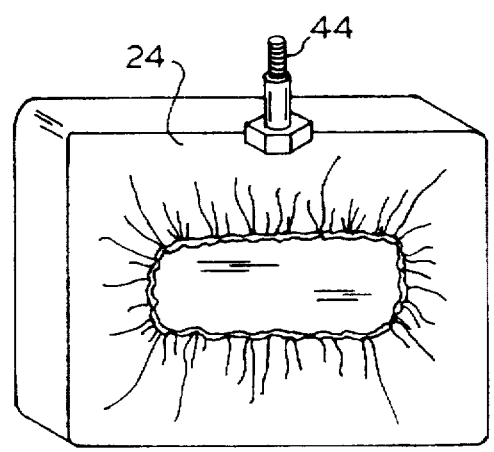
FIG. 7 is a perspective view of a cushion which has a fabric cover placed over the cushion and the plate, and through which cover, the threaded portion extends.

The padded portion of the cushion is preferably made of a material as is known in the art to provide a comfortable cushion, and is covered with an attractive upholstery or other durable material, by means known in the art. Cushion 24 is detachably attachable to clamp 22 at any one of the attachment sites 34. The preferred means of attachment is a threaded portion 44 protruding from the side of the cushion 24 as shown in FIGS. 4 and 7. In order that there be a firm attachment of the threaded portion 44 to the cushion 24, the threaded portion is preferably welded or otherwise firmly attached to, or molded together with, a plate 46 which is preferably the size and shape of one side of the cushion 24 as shown in FIGS. 6–7. As shown in dotted lines in FIG. 6, the plate may be slightly curved so that when it is inserted along with a cushion in a cushion cover, the cushion is constrained to be slightly curved, which allows positioning of the cheek or other part of the face in the slight central cavity formed in the curved cushion (not shown).

To assemble the preferred cushion, a plate 46 with the affixed threaded portion is enclosed within an outer decorative covering of the cushion, during assembly of the cushion, so that threaded portion 44 protrudes through an opening in a seam of the cushion as shown in FIG. 7. Preferably the covering has a gathered opening which can be stretched to insert the cushion plate and after insertion of the cushion in the covering, the opening pulls back together, for example, as shown in FIG. 7. This allows the cover to be easily removed for cleaning or replacement.

Figure 9:
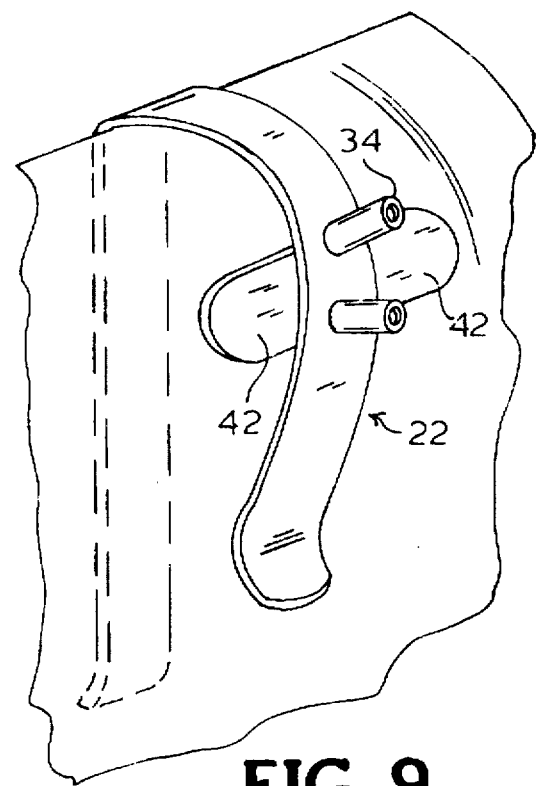
FIG. 9 is a perspective view of the headrest of the invention attached to a seat, also showing the optional lateral flaps.

To stabilize the headrest when mounted on a seat, particularly in the embodiments where the sideways width of arm 29 is quite narrow, there is preferably a lateral flap area 42 provided on arm 29 on each side of the plurality of attachment sites 34 (FIG. 9). The lateral flap areas 42 can be integrally molded with arm 29 of clamp 22, or can be welded or otherwise attached as is known in the art. When a person's head rests heavily on the cushion 24, the presence of lateral flaps 42 prevents the clamp from tipping sideways away from the person.

The user of the headrest, or a traveling companion, places the clamp portion over the back of a seat, at the top or side of the back as desired. Cushion 24 is attached at the desired height to one of the attachment positions 34, depending on where the person wishes to rest his or her head. Threaded portion 44 can be screwed into the selected attachment site 34 to the desired distance from clamp 22, and at that height, the angle of the cushion 24 is fine-adjusted.

Figure 5:
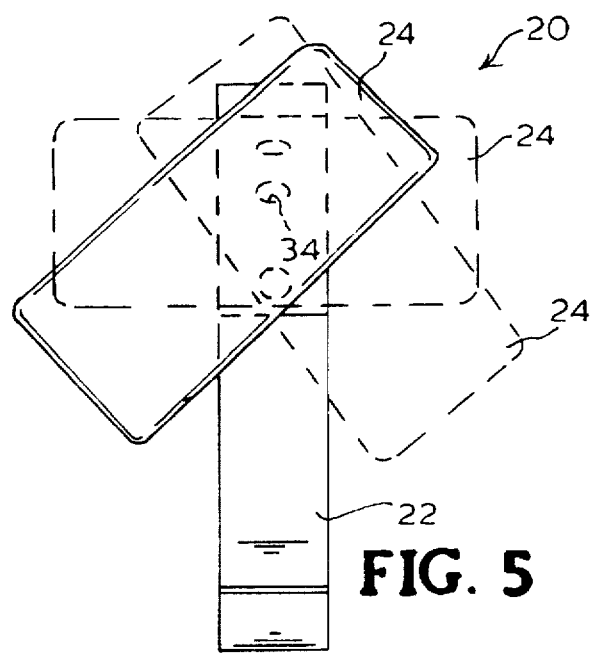
FIG. 5 is a front elevational view of a cushion attached to a clamp, showing some of the possible alternative angles in dashed lines.

The greater the length of the threaded portion 44, the more variation in distance is possible. To make it easier to thread the threaded portion 44 into an attachment site 34, which is particularly useful for persons of limited dexterity, the threads may be made larger, and more spaced apart than is usual with screws. The user may easily adjust the angle or distance by rotating the cushion 24 in the attachment site (FIG. 5). Increased pressure of the user's head in the desired direction can cause the angle of the cushion to be adjusted to be more flat or more upright. The user may also change attachment sites as desired by simply unscrewing the cushion from one attachment site, and screwing it into another attachment site. This latter adjustment allows the user to be supported when seated erectly in the seat or when more slumped sideways. In addition, for different users, or for more extreme changes in body position, the clamp, with the cushion still attached or with the cushion detached, may be changed from one position on the seat back to another.

Figure 8:
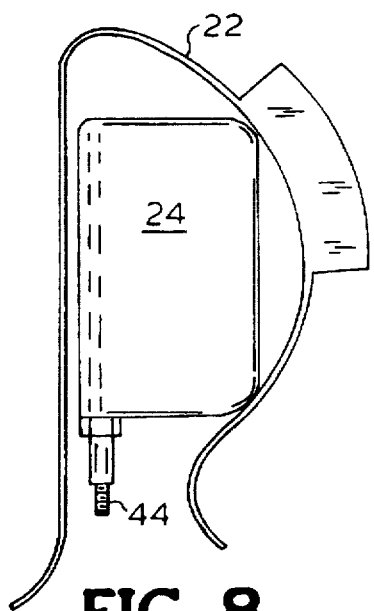
FIG. 8 is a side elevational view of a carrying/storage position of the invention.

When the user has finished traveling or for other reasons wishes to cease use of the headrest 20, the user may either leave the headrest 20 in position or may easily remove it from the seat back. For compact carrying, the cushion 24 may be unscrewed from the clamp 22 and inserted within the D-shape of clamp 22 as shown in FIG. 8. In this compact position, the headrest may be carried in a briefcase or purse, or be placed in a glove compartment or other small space for convenient storage.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A headrest for use in combination with a seat back structure, comprising:

a) a clamp having a plurality of attachment sites and being detachably attachable to a side or top of the seat back structure; and b) a cushion detachably attachable to the clamp at any one of the attachment sites, at a plurality of distances from the clamp, and a plurality of angles to the clamp, wherein each attachment site of the plurality of attachment sites comprises a tubular portion which is interiorly threaded, and the cushion has a threaded portion which is attachable to the clamp by threading the threaded portion into a selected tubular portion to a desired depth to effect a desired headrest location and angle.

2. The headrest of claim 1, wherein the threaded portion is attached to a plate which is attached to the cushion.

* * * * *